US008826446B1

(12) United States Patent
Liu et al.

(10) Patent No.: US 8,826,446 B1
(45) Date of Patent: Sep. 2, 2014

(54) SYSTEM AND METHOD FOR APPLYING PRIVACY SETTINGS TO A PLURALITY OF APPLICATIONS

(75) Inventors: Sean Y. Liu, Sunnyvale, CA (US); Alex M. Cook, III, San Francisco, CA (US); Matthew Stephen Steiner, Mountain View, CA (US); Jonathan S. McPhie, Mountain View, CA (US); Pavani Naishadh Diwanji, San Jose, CA (US); David M. Cohen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 13/009,235

(22) Filed: Jan. 19, 2011

(51) Int. Cl.
H04L 29/06 (2006.01)
G06F 21/00 (2013.01)

(52) U.S. Cl.
USPC .................................................. 726/26; 726/1

(58) Field of Classification Search
None
See application file for complete search history.

(56) References Cited

U.S. PATENT DOCUMENTS

| | | | |
|---|---|---|---|
| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |

(Continued)

FOREIGN PATENT DOCUMENTS

WO WO0279984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Gilberto Barron, Jr.
*Assistant Examiner* — Simon Kanaan
(74) *Attorney, Agent, or Firm* — Patent Law Works LLP

(57) ABSTRACT

A system and method for adjusting privacy protection for a user in a plurality of applications is disclosed. A privacy protection request is sent to a user device. In one embodiment, the request is displayed on user device in the form of a pop-up window. In another embodiment, the request is displayed in a privacy settings area. The privacy protection request includes a plurality of protection levels. Once a protection level is selected the protection level is sent back and received by the system. Privacy settings are adjusted according to the selected privacy protection level based on information stored in a master template. In some embodiments, the privacy protection level is translated to associated privacy settings. Once the privacy settings have been adjusted, the privacy settings are applied to a plurality of online applications associated with the user based on the privacy protection level selected.

20 Claims, 10 Drawing Sheets

(56) References Cited

U.S. PATENT DOCUMENTS

| | | | |
|---|---|---|---|
| 2008/0056475 A1 | 3/2008 | Brannick et al. | |
| 2008/0192656 A1 | 8/2008 | Vagelos | |
| 2009/0171964 A1* | 7/2009 | Eberstadt et al. | 707/9 |
| 2011/0098156 A1 | 4/2011 | Ng et al. | |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announcesfire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

| Feature | Low | Medium | High |
|---|---|---|---|
| First/Last Name | Public | Public | Only me |
| Profile Photo | Public | Friends | Only me |
| Introduction | Public | Friends | Only me |
| Occupation | Public | Friends | Only me |
| Phone | Public | Friends | Only me |
| Email Address | Public | Friends | Only me |
| Residential Address | Public | Friends | Only me |
| Age | Public | Friends | Only me |
| Sex | Public | Friends | Only me |
| Photos | Public | Friends | Only me |
| Groups | Public | Friends | Only me |
| ⋮ | ⋮ | ⋮ | ⋮ |

| Feature | Protection Level | Setting |
|---|---|---|
| First/Last Name | Medium | Public |
| Profile Photo | Medium | Friends |
| Introduction | Medium | Friends |
| Occupation | Medium | Friends |
| Phone | Medium | Friends |
| Email Address | Medium | Friends |
| Residential Address | Medium | Friends |
| Age | Medium | Friends |
| Sex | Medium | Friends |
| Photos | Medium | Friends |
| Groups | Medium | Friends |
| ⋮ | ⋮ | ⋮ |

Figure 6

SYSTEM AND METHOD FOR APPLYING PRIVACY SETTINGS TO A PLURALITY OF APPLICATIONS

The specification relates to social networks. In particular, the present specification relates to adjusting privacy settings for user applications and adjusting privacy settings for a plurality of online applications for a social network system.

BACKGROUND

Social networks are becoming an increasingly popular way for people to stay connected. This increasing popularity of social networks has given rise to social network services that have developed various ways users of the social network can communicate and share information. Users within a social network can send each other messages, view other users' activities and share personal information, including personal photographs and videos. Social networking services can provide a forum for users to remain in close contact despite geographic distance or uncoordinated schedules. Further, the development of other online services that enable the general sharing of information has also increased. The ability for users to share information with others, and view information about others is available in many different venues.

Within such venues, users are able to adjust the amount and type of information they chose to share and how and to whom that information is shared. This capability is available within each application and users are able to access this capability when interacting with the particular application. Often, these applications include default privacy settings that are set regardless of user specification or preferences.

SUMMARY OF THE INVENTION

The present invention overcomes the deficiencies and limitations of the prior art at least in part by providing a system and method for adjusting privacy settings for a plurality of online applications within a social network system.

The present invention provides a system for adjusting privacy settings for a plurality of online applications within a social network system. A privacy protection request is sent to a user device. In one embodiment, the request is displayed on user device in the form of a pop-up window. In another embodiment, the request is displayed in a privacy settings area. The privacy protection request includes a plurality of protection levels. Once a protection level is selected the protection level is sent back and received by the system. Privacy settings are adjusted according to the selected privacy protection level based on information stored in a master template. In some embodiments, the privacy protection level is translated to associated privacy settings. Once the privacy settings have been adjusted, the privacy settings are applied to a plurality of online applications associated with the user based on the privacy protection level selected.

Another embodiment discloses a system for adjusting privacy settings in a plurality of online applications. The system includes a processor, and at least one module stored in the memory and executed by the processor, the at least one module including instructions for the following: sending a privacy protection request to a user, wherein the privacy protection request includes a plurality of privacy protection levels; receiving a level of privacy protection from the user; and adjusting at least one corresponding privacy setting associated with the user in response to receiving the level of privacy protection; applying the at least one corresponding privacy setting to the plurality of applications, wherein the applications are associated with the user.

Yet another embodiment discloses a graphical user interface for adjusting privacy settings in a plurality of online applications. The graphical user interface includes a request for a level of privacy protection. The request includes a plurality of levels of protection that correspond to privacy settings for at least one feature. In some embodiments, the request is in the form of a pop-up window.

BRIEF DESCRIPTION OF THE DRAWINGS

The invention is illustrated by way of example, and not by way of limitation in the figures of the accompanying drawings in which like reference numerals are used to refer to similar elements.

FIG. 5 is a diagram illustrating an example of a master template according to one embodiment of the present invention.

FIG. 6 is a diagram illustrating an example of a data set of privacy settings of a user in a social network system according to one embodiment of the present invention.

DETAILED DESCRIPTION OF THE PREFERRED EMBODIMENTS

Figure 1:
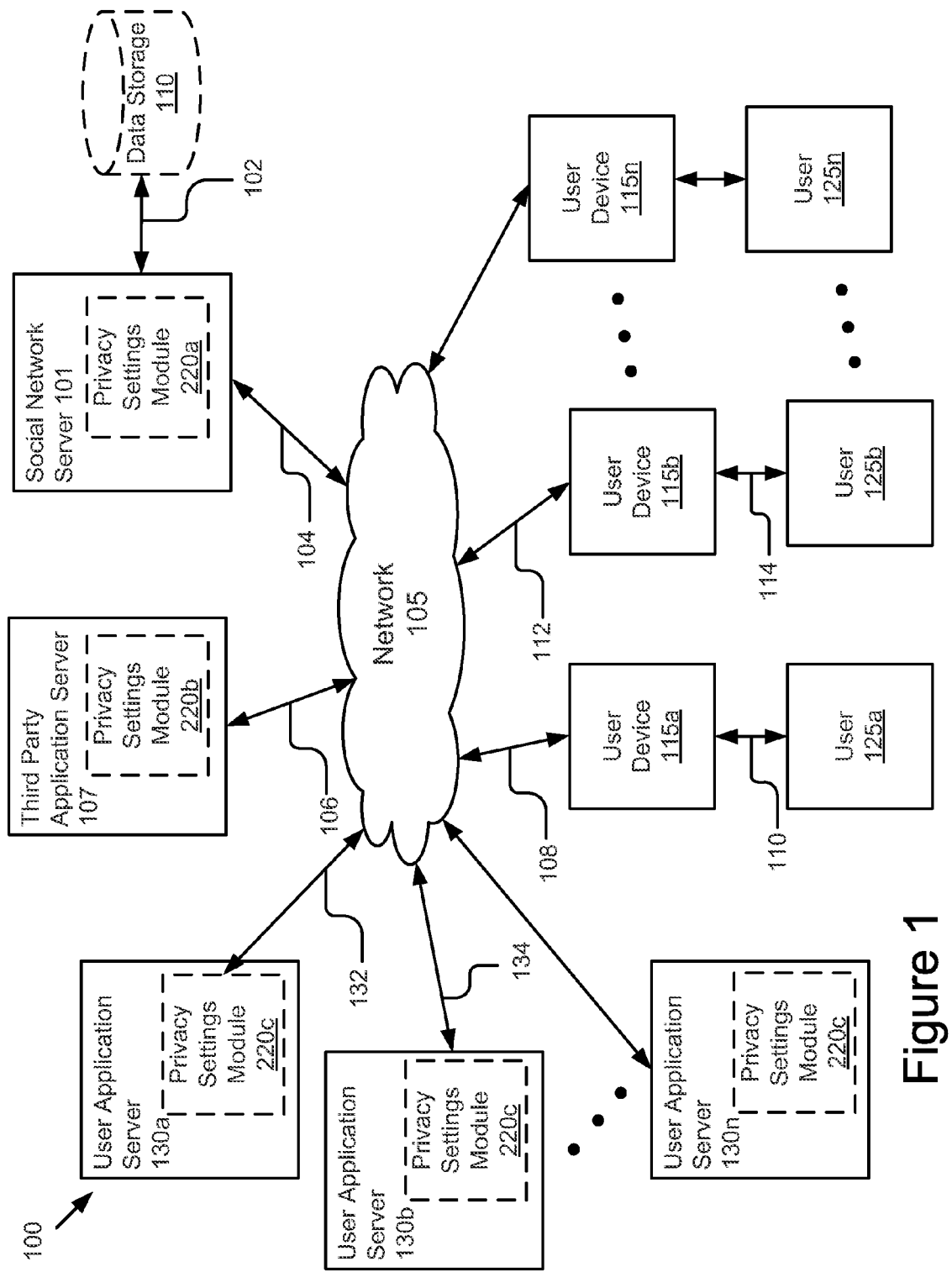
FIG. 1 illustrates a block diagram of a system for applying privacy settings to multiple online applications associated with one user according to one embodiment of the present invention.

A system and method for applying privacy setting to a plurality of online applications is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 illustrates a block diagram of a social network system 100 for applying privacy settings to multiple online applications associated with one user according to one embodiment of the present invention according to one embodiment of the present invention. The illustrated invention of the social network system 100 for applying privacy settings to multiple online applications includes user devices 115*a*, 115*b* that are accessed by users 125*a*, 125*b*, a social network server 101 and a third party server 107. The system 100 also includes user application servers 130*a*, 130*b*. In the illustrated embodiment, these entities are communicatively coupled via a network 105. Although only two devices are illustrated, persons of ordinary skill in the art will recognize that any number of user devices 115*n* is available to any number of users 125*n*. Further, although only two user application servers 130*a*, 130*b* are illustrated, persons of ordinary skill in the art will recognize that any number of user application servers 130*n*.

The user devices 115*a*, 115*b* and user application servers 130*a*, 130*b* in FIG. 1 are used by way of example. While FIG. 1 illustrates two devices, the present invention applies to any system architecture having one or more user devices and one or more user application servers. Furthermore, while only one network 105 is coupled to the user devices, 115*a*, 115*b*, the social network server 101 and the third party server 107, in practice any number of networks 105 can be connected to the entities. Furthermore, while only one third party application server 107 is shown, the system 100 could include one or more third party application servers 107.

The social network server 101 also contains a social network module 209. Although only one social network server 101 is shown, persons of ordinary skill in the art will recognize that multiple servers may be present. A social network is any type of social structure where the users are connected by a common feature. Examples include, but are not limited to, Orkut, Buzz, blogs, microblogs, and Internet forums. The common feature includes friendship, family, a common interest, etc. The common feature includes friendship, family, work, an interest, etc.

The network 105 enables communications between user devices 115a, 115n, the social network server 101, the third party application 107 and user application servers 130a, 130b, 130n. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment of the present invention, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial- or satellite-based transceivers). In one embodiment of the present invention, the network 105 is an IP-based wide or metropolitan area network.

In some embodiments, the network 105 helps to form a set of online relationships between users 125a, 125n, such as provided by one or more social networking systems, such as social network system 100, including explicitly-defined relationships and relationships implied by social connections with other online users, where the relationships form a social graph. In some examples, the social graph can reflect a mapping of these users and how they are related.

In one embodiment, a privacy settings module 220a is included in the social network server 101 is operable on the social network server 101. In another embodiment, the privacy settings module 220b is included in the third party application server 107 and is operable on the third party application server 107. In another embodiment, the privacy settings module 220c is included in the user application server 130a/130b/130c and is operable on the user application server 130a/130b/130c. Persons of ordinary skill in the art will recognize that the privacy setting module 220 can be stored in any combination on the devices and servers. In some embodiments the privacy setting module 220a/220b includes multiple, distributed modules that cooperate with each other to perform the functions described below. Details describing the functionality and components of the privacy setting module 220a of the social network server will be explained in further detail below with regard to FIG. 3.

In the illustrated embodiment, the user device 115a, 115b are coupled to the network 105 via signal lines 108 and 112, respectively. The user 125a is communicatively coupled to the user device 115a via signal line 110. Similarly, the user device 115b is coupled to the network via signal line 112. The user 125b is communicatively coupled to the user device 115b via signal line 114. The third party application 107 is communicatively coupled to the network 105 via signal line 106. The social network server 101 is communicatively coupled to the network 105 via signal line 104. In one embodiment, the social network server 101 is communicatively coupled to data storage 110 via signal line 102. The user application servers 130a, 130b are coupled to the network 105 via signal lines 132, 134, respectively.

In one embodiment, data storage 110 stores data and information of users 125a/125n of the social network system 100. Such stored information includes user profiles and other information identifying the users 125a/125n of the social network system 100. Examples of information identifying users includes, but is not limited to, the user's name, contact information, sex, relationship status, likes, interests, links, education and employment history, location, political views, and religion. In one embodiment, the information stored in data storage 110 also includes the user's list of current and past friends and the user's activities within the social network system 100, such as anything the user posts within the social network system 100 and any messages that the user sends to other users. In another embodiment, which will be discussed below, a storage device 214 (see FIG. 2) is included in the social network server 101 and storage 214 stores the data and information of users 125a/125n of the social network system 100.

In one embodiment, the user device 115a, 115n is an electronic device having a web browser for interacting with the social network server 101 via the network 105 and is used by user 125a, 125n to access information in the social network system 100. The user device 115a, 115n can be, for example, a laptop computer, a desktop computer, a tablet computer, a mobile telephone, a personal digital assistant (PDA), a mobile email device, a portable game player, a portable music player, a portable music player, or any other electronic device capable of accessing a network.

In one embodiment, the user application servers 130a, 130b are servers that provides varies services. Specifically, the user application servers 130a, 130b are servers that enable users of the social network system 100 to share information with other users of the social network system 100. For example, user applications servers 130a, 130b, 130n are servers that provide services such as the following: social networking; online blogging; organizing online calendars; creating, editing and sharing online calendars; sharing pictures; email services; creating and sharing websites; online chatting; sharing videos; and any other services that allow users to display and present information on the network 105. For example, in one embodiment, user application server 130a is a second social network server; user application server 130b is a third social network server; and user application server 130n is a fourth social network server. To illustrate in another example, according to another embodiment, the user applications server 130a is an email server; user applications server 130a is a photo sharing server; and user applications server 130a is a second social network server.

Social Network Server 101

Figure 2:
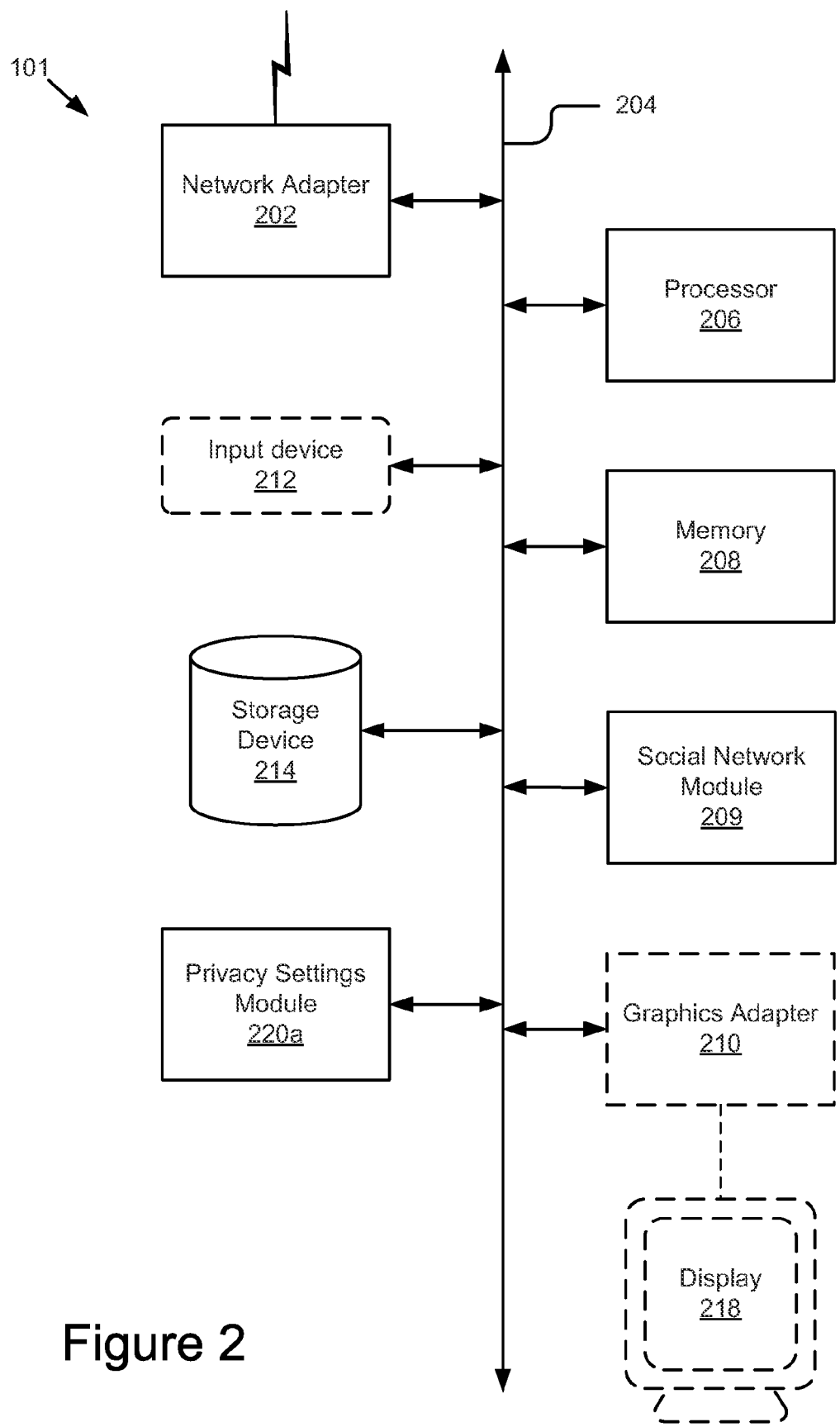
FIG. 2 is a block diagram of an embodiment of a social network server in accordance with the present invention.

FIG. 2 is a block diagram of an embodiment of a social network server 101 in accordance with the present invention.

As illustrated in FIG. 2, social network server 101 includes a network adapter 202 coupled to a bus 204. According to one embodiment, also coupled to the bus 204 are at least one processor 206, memory 208, a social network module 209, a graphics adapter 210, an input device 212, a storage device 214, and a privacy settings module 220a. In one embodiment, the functionality of the bus 204 is provided by an interconnecting chipset. The social network server 101 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the social network server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The social network server 101 also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the social network server 101. In one embodiment, the privacy settings module 220a is stored in memory 208 and executable by the processor 206.

The social network module 209 is software and routines executable by the processor 206 to control the interaction between the social network system 101, storage device 214 and the user device 115a, 115b. An embodiment of the social network module 209 allows users 125a, 125b of user devices 115a, 115b to perform social functions between other users 125a, 125b of user devices 115a, 115b within the social network system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 is used to store user profiles and other information identifying users 125a/125n of the social network system 100. In some embodiments, such user data is stored in storage device 214. In other embodiments, such user data is stored in data storage 110. In yet other embodiments, the user data is stored both is storage device 214 and data storage 110.

The input device 212 may include a mouse, track ball, or other type of pointing device to input data into the social network server 101. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 318 represents any device equipped to display electronic images and data as described herein. The network adapter 202 couples the social network server 101 to a local or wide area network.

The privacy settings module 220a is software and routines executable by the processor 206 to control the interaction between user 125a of user device 115a and user 125b/125n of user devices 115b/115n. An embodiment of the privacy settings module 220a is software and routines executable by the processor 206 to create a master template of privacy settings for multiple online application and apply privacy settings to multiple online applications, thereby controlling information of users displayed within the social network system 100. Details describing the functionality and components of the privacy settings module 220a will be explained in further detail below with regard to FIG. 3.

As is known in the art, a social network server 101 can have different and/or other components than those shown in FIG. 2. In addition, the social network server 101 can lack certain illustrated components. In one embodiment, a social network server 101 lacks an input device 212, graphics adapter 210, and/or display 218. Moreover, the storage device 214 can be local and/or remote from the social network server 101 (such as embodied within a storage area network (SAN)).

As is known in the art, the social network server 101 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Privacy Settings Module 220

Figure 3:
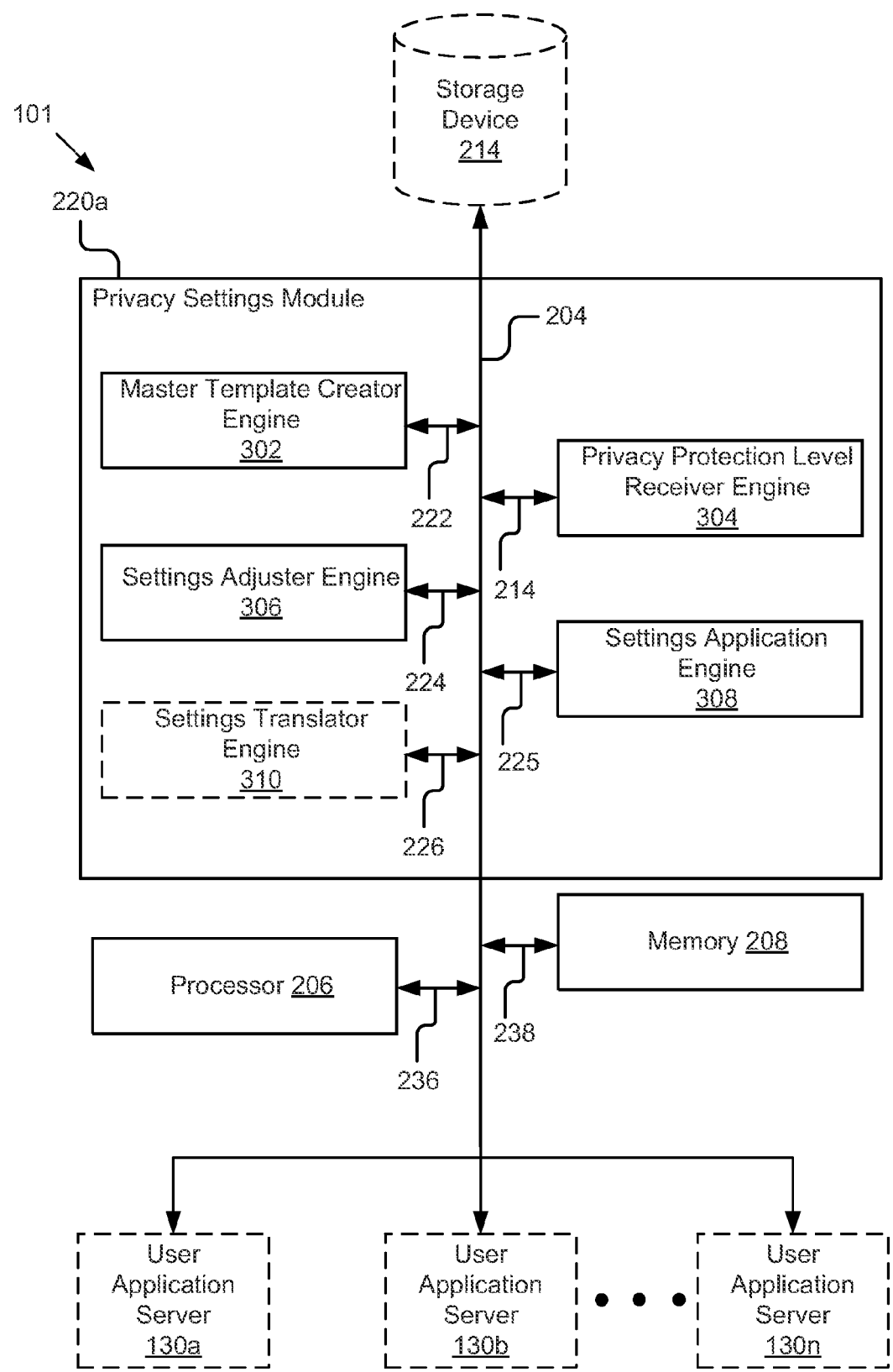
FIG. 3 is a block diagram illustrating an privacy settings module according to one embodiment of the present invention.

Referring now to FIG. 3, the privacy setting module 220a is shown in more detail. FIG. 3 is a block diagram of a portion of the social network server 101 that includes the privacy settings module 220a, a processor 206 and a memory 208, along with other modules and components recited in the description of FIG. 2. In another embodiment, the third party application server 107 includes the privacy settings module 220b. In another embodiment, the privacy settings module 220a is software and routines executable by the processor 206 to create a master template of privacy settings for multiple online applications and apply privacy settings to multiple online applications.

The processor 206 comprises an arithmetic logic unit, a microprocessor, a general purpose controller or some other processor array to perform computations and provide electronic display signals to a display device. The processor 206 is coupled to the bus 204 for communication with the other components via signal line 236. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 208 stores instructions and/or data that may be executed by processor 206. The memory 208 is coupled to the bus 204 for communication with the other components via signal line 238. The instructions and/or data may comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

In one embodiment, the privacy settings module 220 comprises a master template creator engine 302, a privacy protection level receiver engine 304, a settings adjuster engine 306, and a settings application engine 308. In one embodiment, the privacy settings module 220 also includes a settings translator engine 310.

The master template creator engine 302 is software and routines executable by the processor for creating a master template for a user of privacy settings for a plurality of applications. In one embodiment, the master template creator engine 302 is a set of instructions executable by the processor 206 to provide the functionality described below for creating the master template for a user of privacy settings for a plurality of applications. In another embodiment, the master template creator engine 302 is stored in the memory 208 of the social network server 101 and is accessible and executable by the processor 206. In either embodiment, the master template creator engine 302 is adapted for cooperation and communication with the processor 206 and other components of the social network server 101 via signal line 222.

According to one embodiment, the master template creator engine 302 is communicatively coupled to the storage device 214 via bus 204. The master template creator engine 302 is also communicatively coupled, via the privacy setting module 220 of the social network server 101 to user application servers 130a, 130b, 130n. In one embodiment, the master template creator engine 302 receives data from the user application servers 130a, 130b, 130n associated with privacy settings information of users associated with user application servers 130a, 130b, 130n. The master template creator engine 302 sends the privacy settings information to be stored on storage device 214. The storage device 214 stores the privacy setting information from the connected user application servers 130a, 130b, 130n in master template 402, as shown in FIG. 4.

Figure 4:
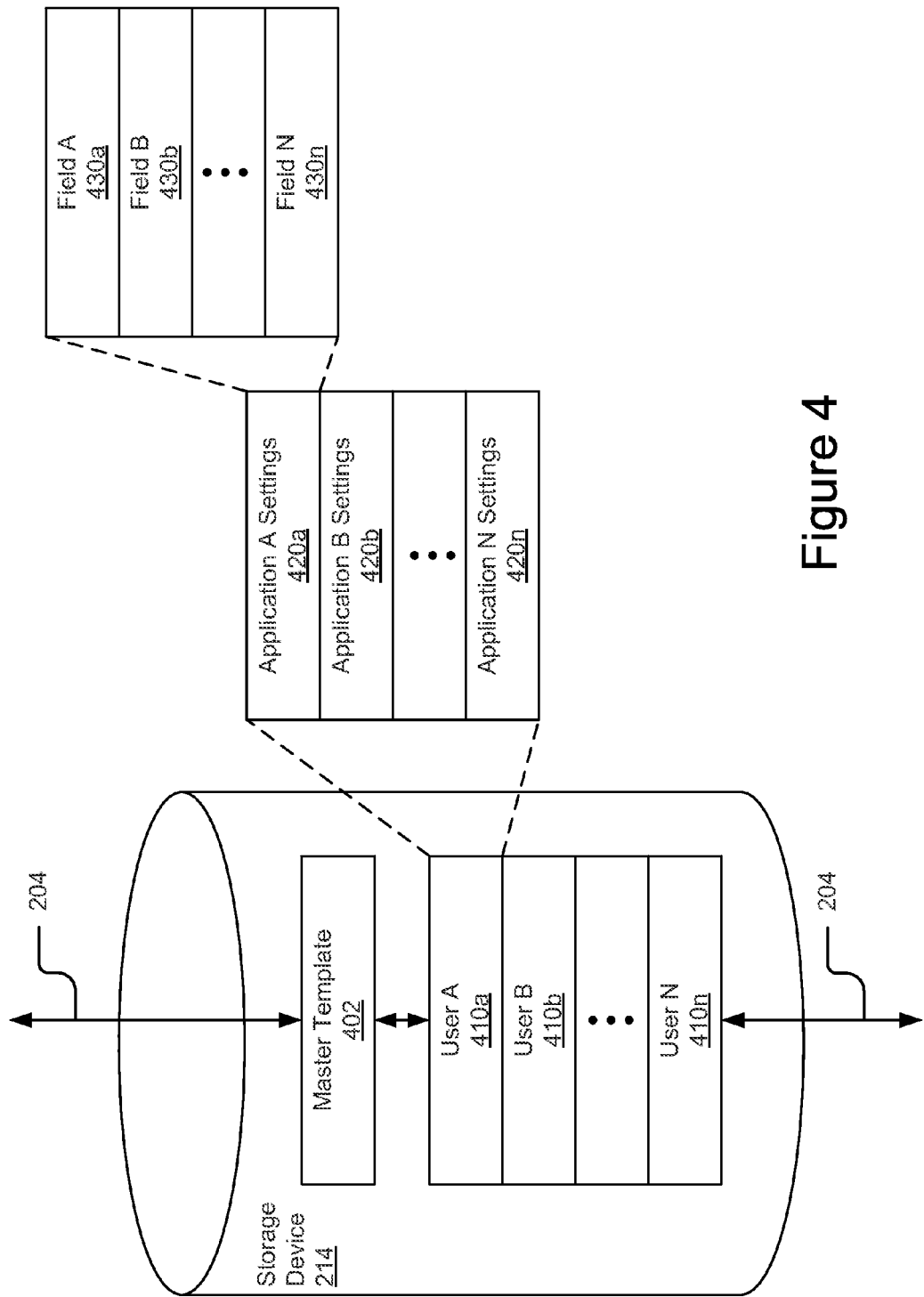
FIG. 4 is a block diagram illustrating a storage device storing a master template and data sets of privacy settings of user on storage device in the system according to one embodiment of the present invention.

As seen in FIG. 4, a block diagram illustrating a storage device 214 storing a master template 402 and data sets 410a, 4100b, 410n of privacy settings of user on storage device 214 in the system 100 according to one embodiment of the present invention. As shown in this example, User A data set 410a includes privacy settings for a first user. The privacy settings for the first user are privacy settings for a plurality of applications and include Application A Settings 420a, Application B Settings 420b and an infinite number of Application N Settings 420n. Application A Settings 420a includes privacy settings for Application A as exemplified in Field A 430a, Field B 430b and Field N430n. As further shown in this example. User B data set 410b includes privacy settings for a second user. The privacy settings for the second user are privacy settings for a plurality of applications and include Application B Settings, Application B Settings and an infinite number of Application N Settings (not shown). Application B Settings 420a includes privacy settings for Application B, such as similar fields, Field A, Field B and Field N (not shown).

Referring to FIG. 5, a diagram illustrating an example of a master template 402 according to one embodiment is shown. Master template 402 includes data sets 502a, 502b and 502c. Each data set 502a/502b/502c is associated with an application, such as the applications the application provided by the user application servers 130a, 130b, 130n. Although three data sets are illustrated, persons of ordinary skill in the art will recognize that any number of data sets is included in master template 402. Data set 502a includes privacy settings data for an application associated with a user application server, such as user application server 130a. Similarly, data set 502b includes privacy setting data for another application associated with a user application server, such as user application server 130b. The "low," "medium" and "high" columns indicate the level of privacy protection that correspond to privacy settings for each feature. In this example, the "low" privacy level column includes the associated privacy settings for each feature for a low level of privacy protection. The "medium" privacy level column includes the associated privacy settings for each feature for a moderate level of privacy protection. The "high" privacy level column includes the associated privacy settings for each feature for a high/secure level of privacy protection. The privacy settings module 220 uses the data contained in the master template 402 to adjust privacy settings based on received level of privacy protection accordingly. This example show three different levels of privacy protection, but one of ordinary skill in the art will recognize that other embodiments may have any number of levels of privacy protection. Also, in other embodiments, the levels may be customizable for each user.

As stated above, the master template creator engine 302 receives data from the user application servers 130a, 130b, 130n associated with privacy settings information of users associated with user application servers 130a, 130b, 130n. The master template creator engine 302 sends the privacy settings information to be stored on storage device 214. The master template creator engine 302 continuously receives and is updated with new information as a result of changes to privacy settings and the addition or removal of privacy settings, as well as the addition or removal of connected applications and associated features.

The privacy protection level receiver engine 304 is software and routines executable by the processor for receiving privacy protection levels from users 125a, 125b of the social network system 100. In one embodiment, the privacy protection level receiver engine 304 is a set of instructions executable by the processor 206 to provide the functionality described below for creating the master template. In another embodiment, privacy protection level receiver engine 304 is stored in the memory 208 of the social network server 101 and is accessible and executable by the processor 206. In either embodiment, the privacy protection level receiver engine 304 is adapted for cooperation and communication with the processor 206 and other components of the social network server 101 via signal line 214.

According to one embodiment, the privacy protection level receiver engine 304 sends a request to user 125a of the user device 115a for a level of privacy protection. In one embodiment, the request is displayed on the user device 115a in the form of a pop-up window. As shown in the graphic representation of an example of a user interface 800 in FIG. 9, a pop-up window 902 requesting a privacy protection level from a user of a social network system 100 is shown. In another embodiment, the request is displayed on the user device 115 a settings area where a user can adjust account settings, as shown in the example of a user interface illustrated in FIG. 10. Additional details are provided below in the descriptions of FIGS. 9 and 10.

In one embodiment, the privacy protection is embodied in three levels. Each privacy protection level corresponds to various privacy settings for a feature. According to one embodiment, a feature is a type of information in an application to be displayed to other users within the social network system 100. Each application includes various features. For example, a feature within a social network service is the user's name. Another feature is a user's profile picture. Another feature is the user's address. According to the embodiment shown, three levels include low, medium and high. A low level of privacy protection applies liberal privacy settings to the features and makes all or most of the information contained in the features available to all the users of the system 100. A medium level of privacy protection applies moderate privacy settings to the features and makes the information contained in the features available to direct connections of the user. A high level of privacy protection applies secure privacy settings to the features and makes the information contained in the features available to only the user. The foregoing is just an example of how levels of privacy protection correlate to individual privacy setting associated with individual feature to adjust such individual privacy settings. Other embodiments can include different and or additional protection levels and different associated privacy settings. In yet other embodiments, the adjustment of the privacy settings in the levels of privacy protection can be customized for each user.

As described in this embodiment, three levels of privacy protection are shown. However, in other embodiments, there can be any number of privacy protection levels. Further, in yet other embodiments, the privacy settings can each by adjusted manually where the user indicates a specific desired privacy setting for each feature.

The privacy protection level receiver engine 304 receives privacy protection information from the user 125a and sends the privacy protection request to the settings adjuster engine 306. The settings adjuster engine 306 is software and routines executable by the processor for adjusting privacy settings based on received privacy protection information. In one embodiment, the privacy settings adjuster engine 306 is a set of instructions executable by the processor 206 to provide the functionality described below for adjusting privacy settings based on received privacy protection information. In another embodiment, the settings adjuster engine 306 is stored in the memory 208 of the social network server 101 and is accessible and executable by the processor 206. In either embodiment, the settings adjuster engine 306 is adapted for cooperation and communication with the processor 206 and other components of the social network server 101 via signal line 224.

The settings adjuster engine 306 receives the privacy protection request from the privacy protection level receiver engine 304 and adjusts the associated privacy settings for the user based on privacy protection information included in the master template 409. For example, if a "low" level of privacy protection is requested, the settings adjuster engine 306 refers to the master template 409 to determine how to adjust the privacy settings accordingly. The appropriate settings are therefore applied to the privacy settings for that particular user within a particular application.

FIG. 6 is a diagram illustrating an example of a data set 410a of privacy settings of a user in a social network system according to one embodiment. Data set 410a includes data sets 420a, 420b and 420n for a user of the system 100. Data set 420a includes privacy settings data for an application associated with a user application server for the user. Similarly, data set 420b includes privacy setting data for another application associated with a user application server for the user. The feature column includes the features included in the application. The Protection Level column indicates the selected level of privacy protection (in this example, the protection from the three levels of protection). The Settings column includes the associated privacy setting for the associated feature based on the level of protection. The setting information is adjusted based on the information contained in the master template 402.

The foregoing data/information is collected upon user consent. In some implementations, a user is prompted to explicitly allow data collection. Further, the user may opt in/out of participating in such data collection activities. Furthermore, the collected data can be anonymized prior to performing the analysis to obtain the various statistical patterns described above.

As stated above, the settings adjuster engine 306 adjusts the associated privacy settings for the user. Upon making privacy settings adjustments, the settings adjuster engine 306 sends the information to the settings application engine 308 for application of the privacy settings to various user applications.

The settings application engine 308 is software and routines executable by the processor for applying the privacy settings based on the level of protection request to privacy settings in various user applications, such as the ones included in user application servers 130a, 130b, 130n. In one embodiment, the settings application engine 308 is a set of instructions executable by the processor 206 to provide the functionality described below for applying the privacy settings. In another embodiment, the settings application engine 308 is stored in the memory 208 of the social network server 101 and is accessible and executable by the processor 206. In either embodiment, the settings application engine 308 is adapted for cooperation and communication with the processor 206 and other components of the social network server 101 via signal line 225.

The settings application engine 308 is communicatively coupled to the user application servers 130a, 130b, 130n as part of the privacy settings module 220 via the social network server 101. The settings application engine 308 receives the adjusted privacy settings information from the settings adjuster engine 306 and applies the adjusted privacy settings to the privacy settings contained in the various user application servers 130a, 130b, 130n accordingly. For example, as mentioned above, the user application servers 130a, 130b are servers that enable users of the social network system 100 to share information with other users of the social network system 100. For example, user applications servers 130a, 130b, 130n are servers that provide services such as the following: social networking; online blogging; organizing online calendars; creating, editing and sharing online calendars; sharing pictures; email services; creating and sharing websites; online chatting; sharing videos; and any other services that allow users to display and present information on the network 105. The settings application engine 308 applies the adjusted privacy settings to the privacy settings associated with these setting accordingly. The application of the adjusted privacy settings determine how information will be presented within these services. For example, in sharing services, the application of the adjusted privacy settings may determine what the default settings should be. In latitude services, the application of the adjusted privacy settings determine whether people will see your location. In document creation services, the application of the adjusted privacy settings determine whether your document will be private or shared with the public.

As mentioned above, according to one embodiment, the privacy settings module 220 also includes a settings translator engine 310. In such embodiments, the settings translator engine 310 is software and routines executable by the processor for translating the level of privacy protection information and adjusting privacy settings accordingly. In one embodiment, the settings translator engine 310 is a set of instructions executable by the processor 206 to provide the functionality described below for translating the level of privacy protection information and adjusting privacy settings accordingly. In another embodiment, the settings translator engine 310 is stored in the memory 208 of the social network server 101 and is accessible and executable by the processor 206. In either embodiment, the settings translator engine 310 is adapted for cooperation and communication with the processor 206 and other components of the social network server 101 via signal line 226.

According to one embodiment, settings translator engine 310 receives the level of protection request from the privacy protection level receiver engine 304, translates the protection request to associated privacy settings and sends the translated information to the settings adjuster engine 306 for adjustment of privacy settings of users of the social network system 100.

As mentioned above, in one embodiment, the privacy settings module 220c is included in the user application server 130a/130b/130c and is operable on the user application server 130a/130b/130c. In such embodiments, privacy settings module 220c of the user application server 130a/130b/130c communicates with the master template 402 in order to extend or add various settings. In some embodiments, application-specific settings are stored in the user application server 130a/130b/130c.

Method

Figure 7:
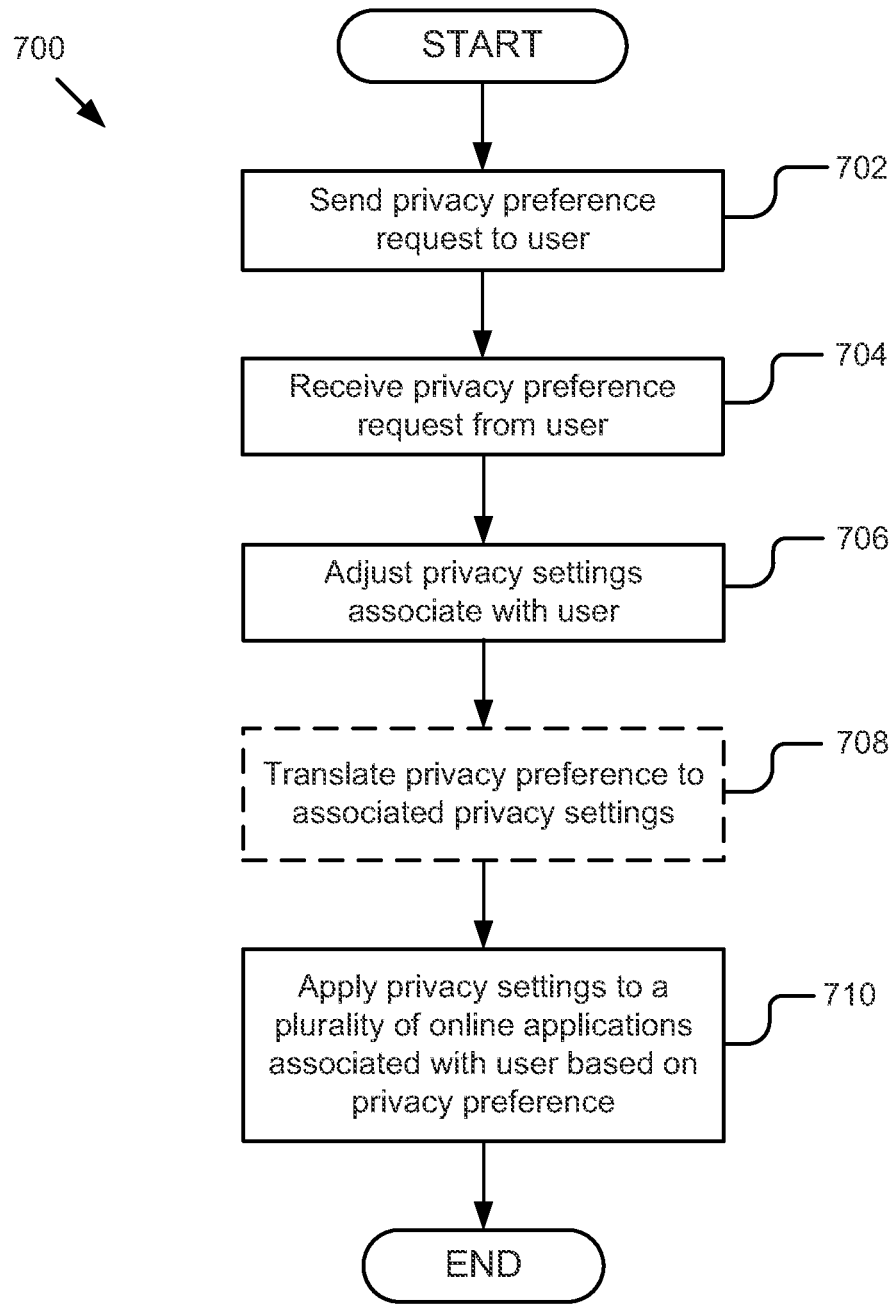
FIG. 7 is a flow chart illustrating a method for adjusting privacy settings for a plurality of online applications according to one embodiment.

Referring now to FIG. 7, a flow chart illustrating an embodiment of a method 700 for adjusting privacy settings for a plurality of online applications in accordance with the present invention is shown.

The privacy protection level receiver engine 304 of the privacy settings module 220 sends 702 a privacy protection request to user device 115a, 115b. As mentioned above, in one embodiment, the request is displayed on user device 115a, 115b in the form of a pop-up window, such as the pop-up window 902 in FIG. 9. In another embodiment, the request is displayed in the Privacy settings area, such as that illustrated in FIG. 10. In such embodiments, the protection request is in the form of an inquire to select one level of protection of multiple levels of protection.

Once a level of protection is selected the request is sent back to the privacy protection level receiver engine 304 and the privacy protection level receiver engine 304 receives 704 the level of privacy protection request. The settings adjuster engine 306 adjusts 706 privacy settings according to the selected level of privacy protection based on information stored in the master template 409. In some embodiments, the privacy protection is translated 708 to associated privacy settings by the settings translator engine 310. Once the privacy settings have been adjusted, the settings applications engine 308 applies 710 the privacy settings to the privacy settings in a plurality of online application associated with the user based on the level of privacy protection selected.

Graphical User Interface

Figure 8:
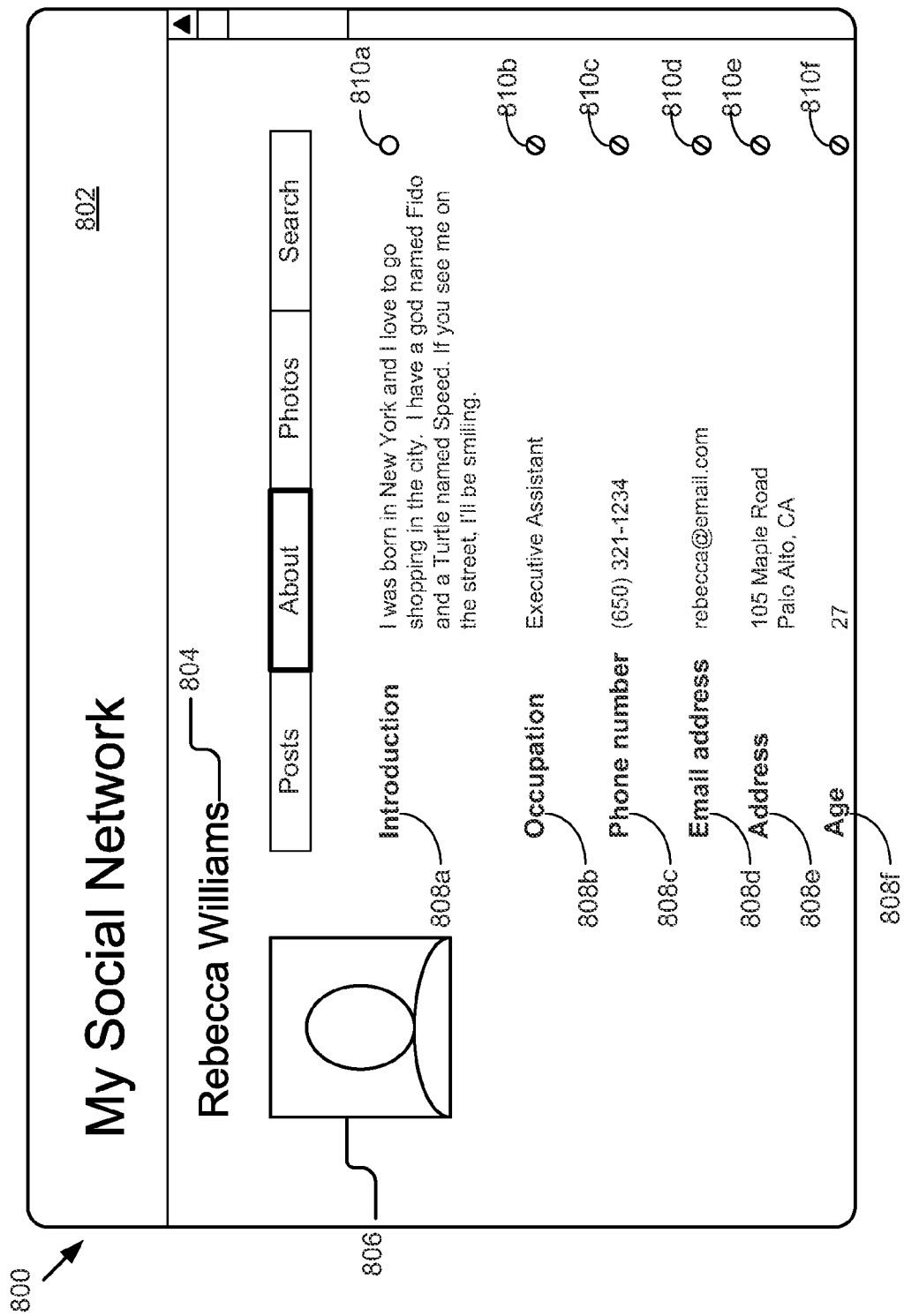
FIG. 8 is a graphic representation of an example of a user interface showing a profile page of a user of a social network system according to one embodiment.

FIG. 8 is a graphic representation of an example of a user interface 800 showing a profile page 802 of a user of a social network system according to one embodiment. The profile page 802 includes a user name 804, profile picture 806, features 808a-808f and privacy settings indicators 810a-810f. The privacy settings indicators 810a-810f indicate who is able to view the corresponding information. In this example, only the user's introduction is available to the public, while the other features are only viewable by the user's direct connections.

Figure 9:
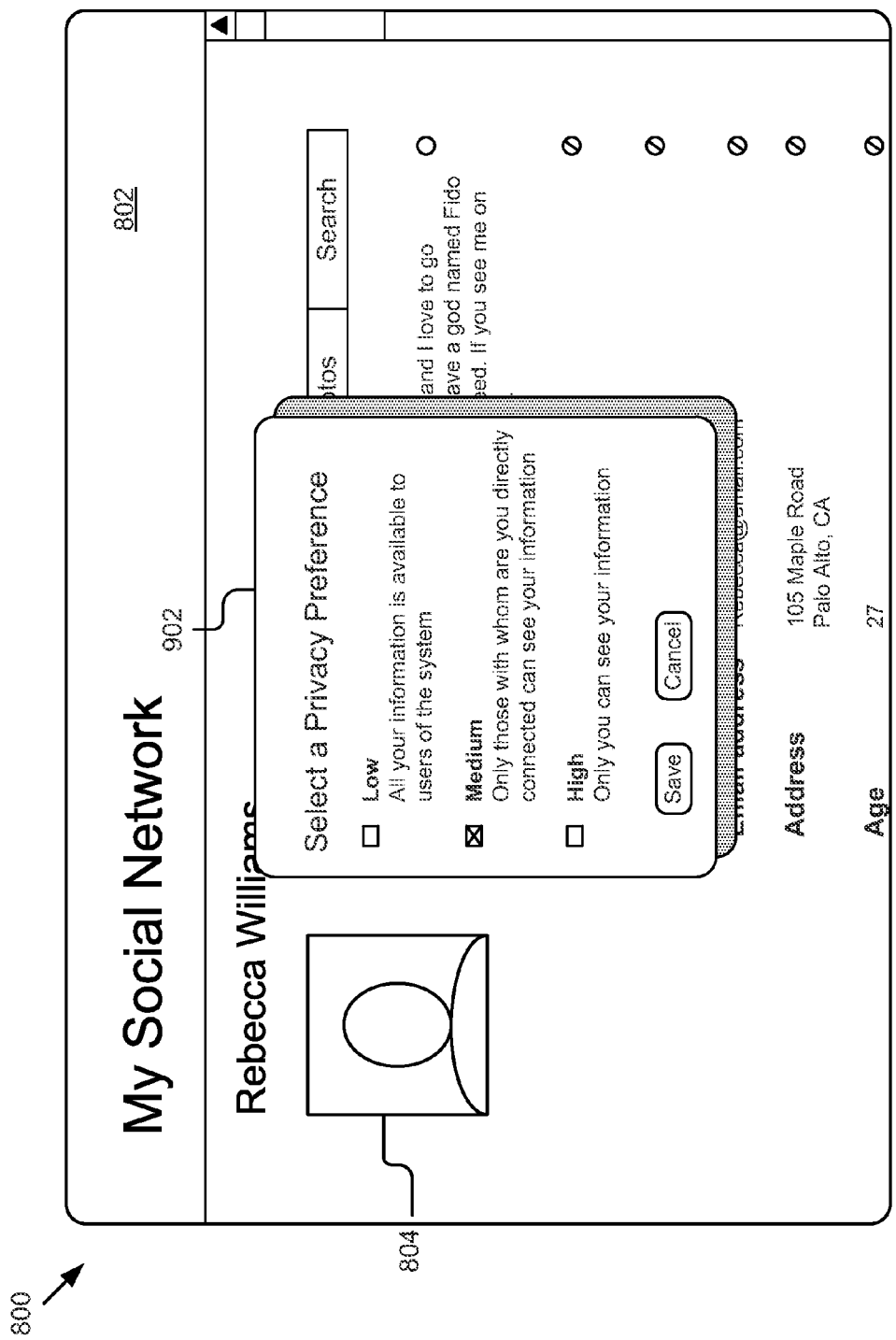
FIG. 9 is a graphic representation of an example of a user interface showing a pop-up window requesting a privacy protection level from a user of a social network system according to one embodiment of the present invention.

FIG. 9 is a graphic representation of an example of a user interface showing a pop-up window requesting a level of privacy protection from a user of a social network system 100 according to one embodiment of the present invention. The user interface 800 includes a pop-up window 902 that requests the user's level of protection. In this example, the privacy protection levels are available: low, medium and high. Here, the medium level of protection has been selected. Once this selection is sent, the appropriate privacy settings will be adjusted throughout various applications.

Figure 10:
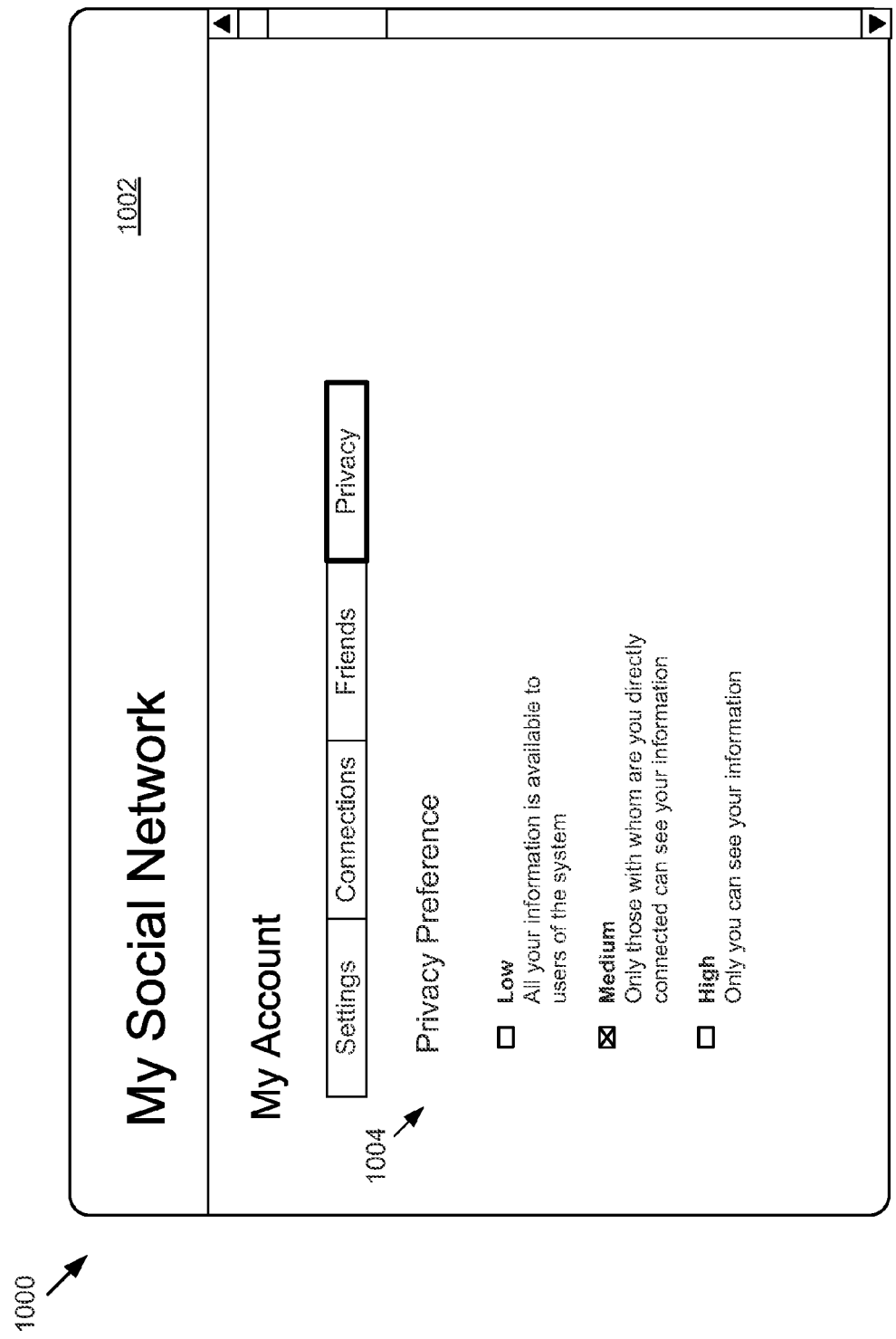
FIG. 10 is a graphic representation of an example of a user interface showing a privacy settings area for selecting a privacy protection level according to one embodiment of the present invention.

According to another embodiment, the privacy protection request can be displayed in the Privacy Settings area for a user. FIG. 10 is a graphic representation of an example of a user interface 1000 showing privacy settings area 1002 for selecting a level of privacy protection according to one embodiment of the present invention. The user interface 1000 includes privacy protection request 1004.

According to one embodiment, a graphical user interface includes a first privacy level object and a second privacy level object. According to such embodiments, selection of the first privacy level object causes application of a first corresponding privacy setting associated with a user for an online social application. Additionally, selection of the second privacy level object causes application of a second corresponding privacy setting associated with the user for the online social application. In some embodiments, selection of the first privacy level object or the second privacy level objects initiates a query of a master template to identify the first corresponding privacy setting or the second corresponding privacy setting.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method for adjusting privacy protection for a user in a plurality of applications, the method comprising:

receiving, using one or more processors, privacy settings information including one or more of the user's privacy settings from the plurality of applications, a privacy setting determining an availability of at least one feature of the user to other users;

generating, using one or more processors, a template based on the privacy settings information from the plurality of applications;

sending, using one or more processors, a privacy protection request to the user, wherein the privacy protection request includes a plurality of privacy protection levels;

receiving, using one or more processors, a level of privacy protection from the user, wherein the privacy protection level determines a privacy setting for each of a set of features associated with the user;

adjusting, using one or more processors, the privacy settings information in the template including adjusting at least one corresponding privacy setting in the template associated with the user in response to receiving the level of privacy protection from the user; and applying, using one or more processors, the adjusted at least one corresponding privacy setting to an associated privacy setting at one or more of the plurality of applications based on the adjusted template, wherein the plurality of applications are associated with the user.

2. The method of claim 1, the method further comprising: translating the level of privacy protection to the at least one corresponding privacy setting.

3. The method of claim 1, wherein the plurality of privacy protection levels and the at least one corresponding privacy setting is stored in the template.

4. The method of claim 1, wherein the privacy preference includes a plurality of preference levels.

5. The method of claim 1, wherein the plurality of applications includes a blogging service.

6. The method of claim 1, wherein the plurality of applications includes a photo sharing service.

7. The method of claim 1, wherein the plurality of applications includes a video sharing service.

8. The method of claim 1, wherein the plurality of privacy protection levels is customizable for each user.

9. A system for adjusting privacy settings in a plurality of online applications, the system comprising:

a processor, and at least one module, stored in a memory and executed by the processor, the at least one module including instructions for:

receiving, using one or more processors, privacy settings information including one or more of the user's privacy settings from the plurality of applications, a privacy setting determining an availability of at least one feature of the user to other users;

generating, using one or more processors, a template based on the privacy settings information from the plurality of applications;

sending a privacy protection request to the user, wherein the privacy protection request includes a plurality of privacy protection levels;

receiving a level of privacy protection from the user, wherein the privacy protection level determines a privacy setting for each of a set of features associated with the user, adjusting the privacy settings information in the template including adjusting at least one corresponding privacy setting in the template associated with the user in response to receiving the level of privacy protection from the user; and applying the adjusted at least one corresponding privacy setting to an associated privacy setting at one or more of the plurality of applications based on the adjusted template, wherein the plurality of applications are associated with the user.

10. The system of claim 9, further comprising instructions for:

translating the level of privacy protection to the at least one corresponding privacy setting.

11. The system of claim 9, wherein the plurality of privacy protection levels and the at least one corresponding privacy setting is stored in the template.

12. The system of claim 9, wherein the privacy preference includes a plurality of preference levels.

13. The system of claim 9, wherein the plurality of applications includes a blogging service.

14. The system of claim 9, wherein the plurality of applications includes a photo sharing service.

15. The system of claim 9, wherein the plurality of applications includes a video sharing service.

16. The system of claim 9, wherein the plurality of privacy protection levels is customizable for each user.

17. A computer program product comprising a non-transitory computer readable medium including a computer readable program, wherein the computer readable program when executed on a computer causes the computer to:

present a graphical user interface for adjusting privacy settings in a plurality of online applications, the privacy settings including one or more of the user's privacy settings received from the plurality of online applications, a privacy setting determining an availability of at least one feature of the user to other users, the graphical user interface comprising:

a request for a level of protection, wherein the request includes a plurality of levels of protection that determine a privacy setting for each of a set of features associated with the user; and apply the determined privacy setting associated with a selected level of protection at the plurality of applications responsive to selection of the selected level of protection.

18. The graphical user interface of claim 17, wherein the request is a pop-up window.

19. A computer program product comprising a non-transitory computer readable medium including a computer readable program, wherein the computer readable program when executed on a computer causes the computer to:

present a graphical user interface comprising:

a first privacy level object, wherein selection of the first privacy level object causes application of a first corresponding privacy setting, at an online social application, for each of a first set of features associated with a user of the online social application; and a second privacy level object, wherein selection of the second privacy level object causes application of a second corresponding privacy setting, at the online social application, for each of a second set of features associated with the user gf the online social application, wherein the first set of features and second set of features are associated with a plurality of applications and, prior to application of one or more of the first corresponding privacy setting and the second corresponding privacy setting, the privacy settings for one or more of the first set of features and second set of features includes the user's privacy settings received from the plurality of applications, a privacy setting determining an availability of at least one feature of the user to other users.

20. The graphical user interface of claim 19, wherein selection of the first privacy level object or the second privacy level objects initiates a query of a template to identify the first corresponding privacy setting or the second corresponding privacy setting.

\* \* \* \* \*